(12) United States Patent
Bonefas et al.

(10) Patent No.: US 9,992,932 B2
(45) Date of Patent: *Jun. 12, 2018

(54) CONTROL ARRANGEMENT AND METHOD FOR CONTROLLING A POSITION OF A TRANSFER DEVICE OF A HARVESTING MACHINE

(71) Applicants: DEERE & COMPANY, Moline, IL (US); CARNEGIE MELLON UNIVERSITY, a Pennsylvania Non-Profit Corporation, Pittsburgh, PA (US)

(72) Inventors: Zachary T. Bonefas, Grimes, IA (US); Alex NyKamp, Moline, IL (US); Jose Gonzalez-Mora, Pittsburgh, PA (US); Herman Herman, Gibsonia, PA (US); Jean-Philippe Tardif, Montreal (CA); Matt Levine, Pittsburgh, PA (US)

(73) Assignees: Deere & Company, Moline, IL (US); Carnegie Mellon University, Pittsburgh, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/339,919

(22) Filed: Oct. 31, 2016

(65) Prior Publication Data

US 2017/0042090 A1 Feb. 16, 2017

Related U.S. Application Data

(60) Continuation-in-part of application No. 15/065,125, filed on Mar. 9, 2016, now Pat. No. 9,532,504, which
(Continued)

(51) Int. Cl.
*A01D 43/08* (2006.01)
*G05D 1/02* (2006.01)

(52) U.S. Cl.
CPC ......... *A01D 43/087* (2013.01); *G05D 1/0246* (2013.01); *G05D 2201/0201* (2013.01)

(58) Field of Classification Search
CPC .. A01B 69/008; A01D 43/087; A01D 43/073; A01D 41/1247; B65G 2203/041;
(Continued)

(56) References Cited

U.S. PATENT DOCUMENTS

| 4,401,403 A | 8/1983 | Johnson et al. |
| 4,441,846 A | 4/1984 | Johnson |

(Continued)

FOREIGN PATENT DOCUMENTS

| DE | 4426059 A1 | 1/1996 |
| DE | 102011082052 A1 | 3/2013 |

(Continued)

OTHER PUBLICATIONS

Moller, Jens, Computer vision—A versatile technology in automation of agriculture machinery, Key Note Report, 21st Annual Meeting, Bologna, EIMA International, Nov. 13-14, 2010.
(Continued)

*Primary Examiner* — Robert E Pezzuto
(74) *Attorney, Agent, or Firm* — Micahel G. Monyok; David G. Oberdick

(57) ABSTRACT

An adjustable transfer device for unloading processed crop onto a container of a transport vehicle including a control arrangement with an electronic control unit, among other integrated components. Electronic control unit calculates position of expected point of incidence of crop flow on the container. Further provided is a system that identifies and tracks a target object in image data, which is then used to determine the trajectory of the target. With the trajectory known, the control arrangement can accurately direct the crop flow into the container.

9 Claims, 11 Drawing Sheets

Related U.S. Application Data is a division of application No. 14/243,323, filed on Apr. 2, 2014, now Pat. No. 9,313,951.

(60) Provisional application No. 61/807,376, filed on Apr. 2, 2013.

(58) Field of Classification Search
CPC ........ B65G 67/04; B65G 67/24; G05B 1/024; G05B 1/0246; G05B 1/0278; G05B 2219/45052; G05B 2219/42249; G05D 1/024; G05D 1/0246; G05D 1/0278; G05D 2219/45052; G05D 2219/42249; G05D 2201/0201
USPC ................... 56/10.2 A–10.2 G, 10.2 R, 16.6; 172/2–11; 348/89, 50; 414/345, 389; 701/28, 40, 50, 300, 408
See application file for complete search history.

(56) References Cited

U.S. PATENT DOCUMENTS

| 4,529,348 | A | 7/1985 | Johnson et al. |
|---|---|---|---|
| 4,573,849 | A | 3/1986 | Johnson et al. |
| 6,097,425 | A | 8/2000 | Behnke et al. |
| 6,943,824 | B2 | 9/2005 | Alexia et al. |
| 8,234,047 | B2 | 7/2012 | Madsen et al. |
| 8,649,940 | B2 | 2/2014 | Bonefas |
| 2006/0094487 | A1 | 5/2006 | Huster et al. |
| 2009/0044505 | A1 | 2/2009 | Huster et al. |
| 2010/0108188 | A1 | 5/2010 | Correns et al. |
| 2010/0332051 | A1 | 12/2010 | Kormann |
| 2013/0227922 | A1 | 9/2013 | Zametzer et al. |
| 2016/0183463 | A1 | 6/2016 | Herman et al. |

FOREIGN PATENT DOCUMENTS

| EP | 1219153 | 12/2001 |
|---|---|---|
| EP | 1219153 A3 | 12/2001 |
| EP | 2792229 A1 | 10/2014 |
| WO | 2015011237 A2 | 1/2015 |
| WO | 2015011237 A3 | 1/2015 |

OTHER PUBLICATIONS

European Search Report for European Application EP15193363.7 dated Apr. 20, 2016.
European Search Report for European application EP14163185 dated Sep. 19, 2014.
Australian Examination Report for Australian application 2014201885 dated Feb. 20, 2017.
European Search Report for European Application EP17199366.0 dated Mar. 7, 2018.
European Search Report for European Application EP17199364.5 dated Mar. 22, 2018.
European Search Report for European Application EP17199365.2 dated Feb. 20, 2018.
Wijnhoven, R. et al. "Fast training of object detection using stochastic gradient descent." In Pattern Recognition (ICPR), 2010 20th International Conference on, pp. 424-427. IEEE, 2010.
Barth, A. "Vehicle tracking at urban intersections using dense stereo." In 3rd Workshop on Behaviour Monitoring and Interpretation, BMI, pp. 47-58. 2009.
Barrois, B. et al. "3D pose estimation of vehicles using stereo camera." In Encyclopedia of Sustainability Science and Technology, pp. 10589-10612. Springer New York, 2012.

CONTROL ARRANGEMENT AND METHOD FOR CONTROLLING A POSITION OF A TRANSFER DEVICE OF A HARVESTING MACHINE

CROSS-REFERENCE TO RELATED APPLICATIONS

This application is a continuation-in-part of U.S. application Ser. No. 15/065,125, filed Mar. 9, 2016, which is a divisional of U.S. application Ser. No. 14/243,323, filed Apr. 2, 2014 (now U.S. Pat. No. 9,313,951), which claims priority to U.S. Provisional Application Ser. No. 61/807,376, titled CONTROL ARRANGEMENT AND METHOD FOR CONTROLLING A POSITION OF A TRANSFER DEVICE OF A HARVESTING MACHINE and filed Apr. 2, 2013, all of which are incorporated by reference herein in their entirety.

STATEMENT REGARDING FEDERALLY SPONSORED RESEARCH

Not applicable.

BACKGROUND

The present invention pertains to a system and method for controlling a position of an adjustable transfer device of a harvesting machine.

Forage harvesters are used in agriculture to harvest plants from a field, process them, and unload them by means of an adjustable transfer device into a container of a transport vehicle, which drives on a side or to the rear of the forage harvester. The position of the adjustable transfer device, normally arranged in the form of a spout, can be controlled by an operator by means of inputs on a hydraulic handle and actuators, normally hydraulic cylinders, in order to move the adjustable transfer device into a position in which the crop is unloaded into the container of the transport vehicle, but not onto the ground. Usually, the adjustable transfer device can be rotated around a vertical axis, tilted around a horizontal axis to adjust the height of its outer end, and an end flap can be rotated in order to define the exhaust direction of the crop from the transfer device.

To improve loading efficiencies, automatic solutions that use data on the relative position between the harvesting machine and the container have been proposed for controlling the transfer device. Such solutions can utilize an optical image capture device with an image processing system. However, image-based systems are not always able to identify the container correctly, in particular when a field is opened. For example, when opening a field, the forage harvester harvests a first strip of the field with standing crop on both sides such that the transport vehicle follows the forage harvester from behind. In this situation, the distance between the forage harvester and the container is relatively large. It would therefore be advantageous to develop an improved system and method for controlling the position of the transfer device when unloading material into a container positioned at the rear of the harvester.

BRIEF SUMMARY

In one embodiment, the control arrangement comprises an image capture device, mounted on a harvesting machine, which provides an image signal to a target detection module and/or a target tracking module. The target may include the container, a portion of the container, or a vehicle towing the container. The harvesting machine comprises a crop receiving header, a crop processing unit for processing crop received from the header, and an adjustable transfer device for unloading processed crop into the container.

The image capture device, or optical image capture device in one embodiment, has a field of view that includes the target in most operating conditions. The image capture device has an image signal output connected to an image processing system. The control arrangement further comprises an electronic control unit connected to an output of the image processing system. At least one actuator for adjusting the position of the adjustable transfer device is controlled by the electronic control unit. In some embodiments, at least one sensor for sensing the actuator-controlled position of the adjustable transfer device has a signal output connected to the electronic control unit.

The electronic control unit is operable to perform or execute the following steps, according to one embodiment:
(a) locate the target within the image signal;
(b) track the target once identified in the image signal;
(c) receive information about the position of the adjustable transfer device;
(d) to calculate a position of the transfer device relative to the container; and
(e) determine an expected point of incidence of crop flow into the container given the position of the transfer device.

BRIEF DESCRIPTION OF THE DRAWINGS

Embodiments of the disclosure are described in detail below with reference to the accompanying drawings wherein.

DETAILED DESCRIPTION

Figure 1A:
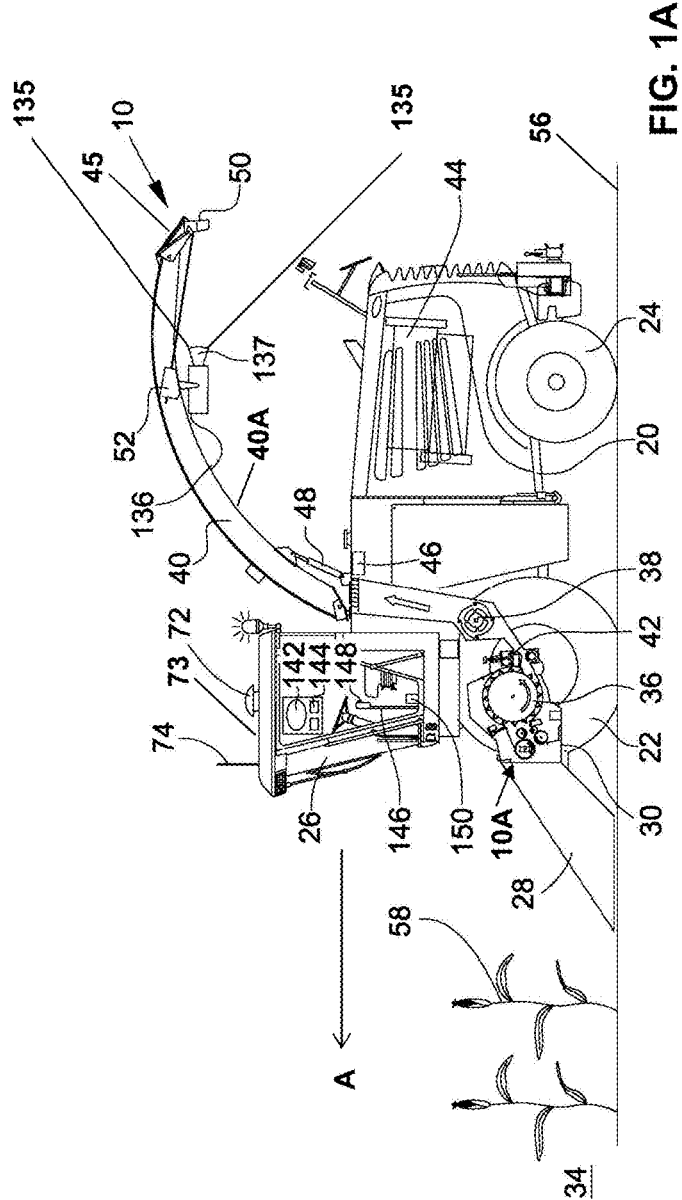
FIG. 1A is a side view of a harvesting machine (e.g., forage harvester).
Figure 1B:
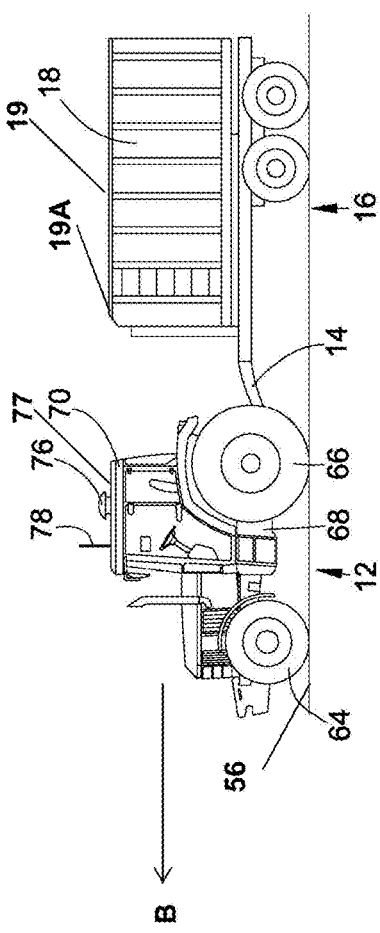
FIG. 1B is a side view of a transport vehicle, which follows the harvesting machine.

A combination of two agricultural machines shown in FIGS. 1A and 1B comprises a self-propelled harvesting machine 10 in the form of a forage harvester (FIG. 1A) and a transport vehicle 12 (FIG. 1B) in the form of a self-propelled tractor, which, by way of a tow bar 14 pulls a trailer 16, which comprises a container 18.

The harvesting machine 10 has a frame 20, which is carried by front-driven wheels 22 and steerable rear wheels 24. The harvesting machine 10 is operated from a driver's cabin 26, from which an operator can see a harvesting attachment 28, in the form of a corn header attachment, which is affixed to an entry channel 30 on the front side 10A of the forage harvester 10. Crop plants 58 harvested from a field 34 by way of the harvesting attachment 28 are conveyed to a cutter head 36 via a gathering conveyor (not shown) with pre-compression rollers (not shown) located in the entry channel 30. The cutter head 36 acts in this embodiment as a crop processing unit for processing the crop plants 58 received from the harvesting attachment 28, and hence chops them into small pieces and delivers them to a discharge accelerator 38. A post-processing device 42 with two kernel processing rollers (not shown) is located removably in the crop flow between the cutter head 36 and the discharge accelerator 38. The post-processing device 42 can be moved into an inoperative position if it is not needed, for example for a grass harvest, or entirely removed from the harvesting machine 10.

The harvesting machine 10 and the harvesting attachment 28 are driven by a combustion engine 44. The crops discharged from the discharge accelerator 38 exit the harvesting machine 10 to the container 18 via an adjustable transfer device 40 in the form of a discharge spout 45, which can be rotated around an approximately vertical axis by way of a first actuator 46 and can be adjusted at a tilt angle by way of a second actuator 48. The discharge direction can be changed by way of a flap 50, the angle of which can be adjusted by way of a third actuator 52. As shown in FIGS. 1A and 1B, the container 18 can trail behind, or move alongside the harvesting machine 10. Movement of the adjustable transfer device 40 allows the crop to be discharged into the container 18 in either orientation.

The transport vehicle 12 and the trailer 16 with the container 18 have a conventional structure. The transport vehicle 12 comprises front, steerable wheels 64 and rear, driven wheels 66, which are supported on a carrying structure 68, which carries a driver's cabin 70. FIGS. 1A and 1B show the harvesting machine 10 and the transport vehicle 12, respectively, in side views. The harvesting machine 10 drives over the field 34 in a forward direction (shown by arrow A) in order to harvest the crop plants 58. The transport vehicle 12, FIG. 1B, follows behind the harvesting machine 10 in the same direction (shown by arrow B). The rear-following orientation occurs when a field 34 is opened, for example, and the transport vehicle 12 would damage the crop plants 58 if it drove alongside the harvesting machine 10. During subsequent passes over the field 34, the transport vehicle 12 may drive on a harvested part of the field 34 on the left or right side of the harvesting machine 10, in a parallel orientation.

The harvesting machine 10 is steered by a driver sitting in the driver's cabin 26 or by a steering device, which operates automatically. The transport vehicle 12 can be equipped with an automated steering device so as to facilitate movement relative to the harvesting machine 10. The harvesting machine 10 could also be any other self-propelling harvesting machine, such as a potato or beet harvester.

In one embodiment, the harvesting machine 10 is equipped with a first position-determining device 72, which is located on the roof 73 of the cabin 26 in the embodiment shown in FIG. 1A. A first radio antenna 74 is also positioned on the roof 73. The transport vehicle 12 is equipped with a second position-determining device 76, which is located on roof 77 of the cabin 70 in the embodiment shown in FIG. 1B. A second radio antenna 78 is also located on the roof 77 of the transport vehicle 12.

Figure 2:
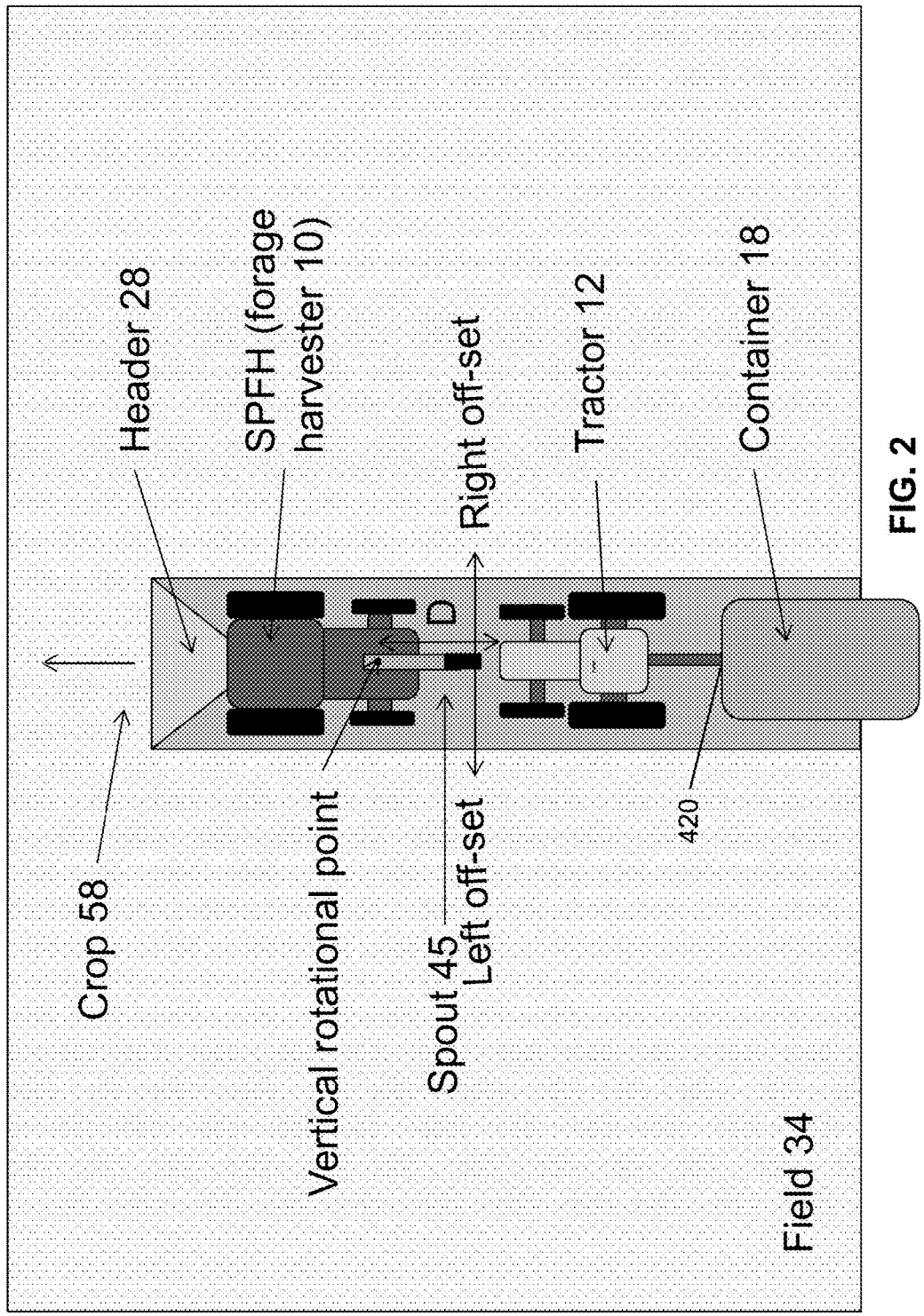
FIG. 2 is a top view illustration of a rear unloading arrangement with the transport vehicle following the harvesting vehicle.

Now turning to FIG. 2, which is a top view of the harvesting machine (forage harvester) 10 opening a field by harvesting and chopping the crop plants 58 from a section of the field as it moves forward. The forage harvester 10 then unloads the chopped material through the spout 45 to a container 18 (e.g., cart) pulled by the transport vehicle 12 (e.g. tractor), which is following behind the harvesting machine 10.

In FIG. 2, the distance D of the harvesting machine (forage harvester) 10 and the transport vehicle 12 can be variable, and the spout 45 needs to be adjusted so the material coming out of the spout 45 will land in the container 18, based on its trajectory as it exits the spout 45. In addition, the transport vehicle 12 path might not be perfectly aligned with the forage harvester 10, and the spout 45 also needs to be adjusted to take into account the left/right offset.

Figure 3A:
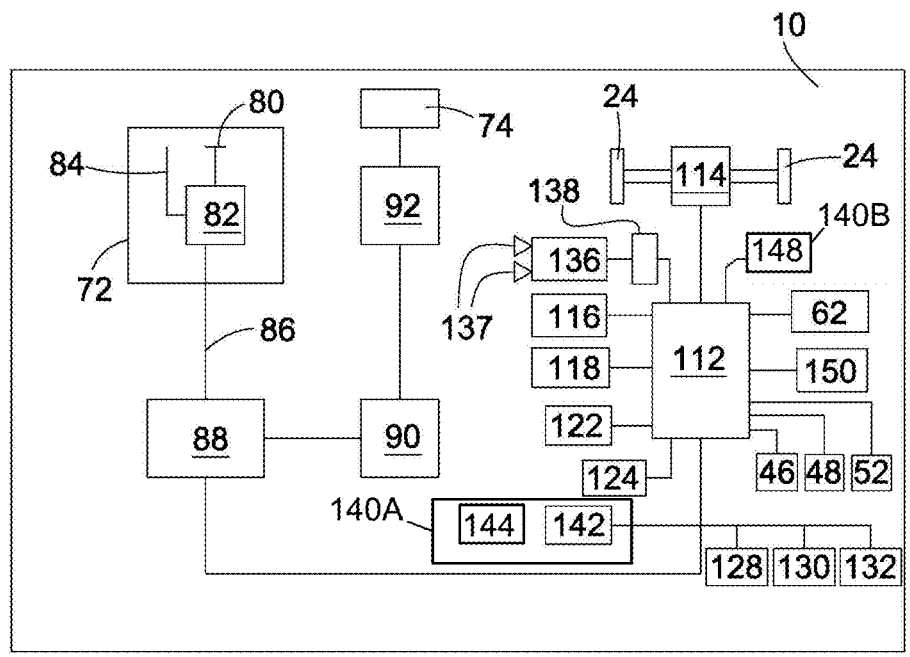
FIG. 3A is a schematic diagram of a control arrangement controlling the position of an adjustable transfer device of the harvesting machine, according to one embodiment.
Figure 3B:
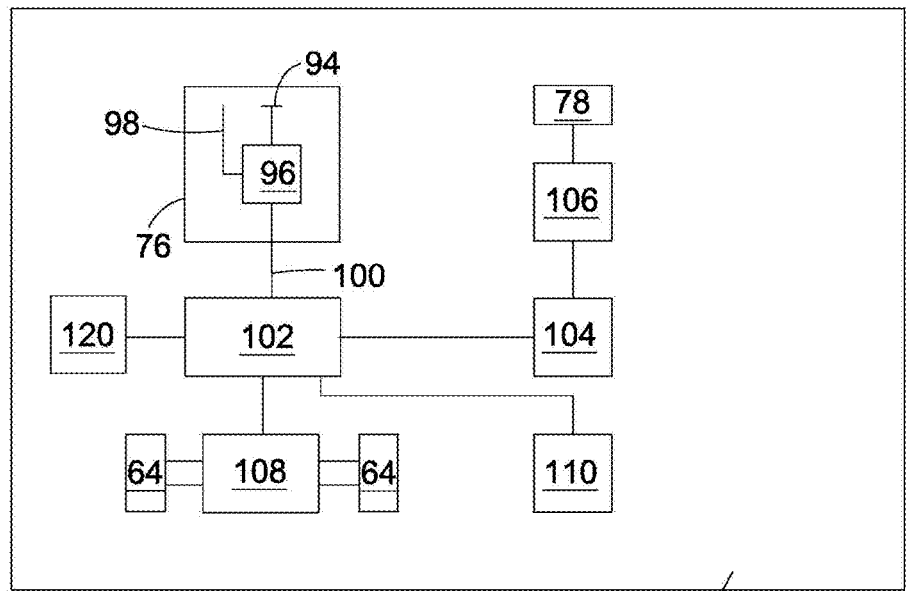
FIG. 3B is a schematic diagram of a control arrangement controlling the position of the transport vehicle.

Now, reference is made to FIGS. 3A and 3B, in which among other things, the individual components of the position-determining devices 72, 76, an electronic control unit 112, actuators 46, 48, 52 for the adjustment of the adjustable transfer device 40 and discharge spout 45, sensors 128, 130, 132 for the detection of their actual position and the steering devices of the transport vehicle 12 (FIG. 3B) and the harvesting machine 10 (FIG. 3A) are schematically shown. Electronic control unit 112 includes a processor and memory. Operating and executable software are stored in memory and executed by the processor. Sensor 128 detects the position of the adjustable transfer device 40 around the vertical axis, as adjusted by actuator 46. Sensor 130 detects the tilt position of the adjustable transfer device 40, as adjusted by actuator 48. Sensor 132 detects the angular position of the flap 50, as adjusted by actuator 52. Some of the above mentioned components are also illustrated in FIG. 1A.

Now turning to FIG. 3A, according to one embodiment, the first position-determining device 72 is on board the harvesting machine 10 and comprises an antenna 74 and an evaluation circuit 82, which is connected to the antenna 80. The antenna 80 receives signals from satellites of a position-determining system, such as GPS, Galileo, or Glonass, which are supplied to an optional evaluation circuit 82. With the aid of the signals of the satellites, the evaluation circuit 82 determines the actual position of the antenna 80. The evaluation circuit 82 can also be connected to a correction data-receiving antenna 84, which receives radio waves radiated from reference stations at known locations. With the aid of the radio waves, correction data for the improvement of the accuracy of the position-determining device 72 are produced by the evaluation circuit 82. The evaluation circuit 82 transmits its position data by way of a bus line 86 to a control device 88.

The control device 88 is connected via an interface 90 to a reception and transmission device 92, which is in turn connected to the radio antenna 74. The reception and transmission device 92 receives and generates radio waves, which are picked up and radiated by the antenna 74.

Analogously, the second position-determining device 76 is located on board the transport vehicle 12. The second position-determining device 76 comprises an antenna 94 and an optional evaluation circuit 96, which is connected to the antenna 94. The antenna 94 receives signals from satellites of the same position-determining system as the antenna 80, which are supplied to the evaluation circuit 96. With the aid of the signals of the satellites, the evaluation circuit 96 determines the actual position of the antenna 94. The evaluation circuit 96 is also connected to a correction data-receiving antenna 98, which receives radio waves radiated from reference stations at known sites. With the aid of the radio waves, correction data for the improvement of the accuracy of the position-determining device 76 are generated by the evaluation circuit 96.

The first and second position-determining devices 72 and 76 can be used to locate the container 18 in situations where direct observation of the container by the image capture device is not possible by calculating the differential positioning. In alternative embodiments, only the second position-determining device 76 is used. In situations where a clear view of the container 18 is possible, the system directly estimates of the container 18 position. In yet another alternative embodiment, the system uses a combination of at least one position-determining device 72/76 and tracking information from the image processing system 138.

By way of a bus line 100, the evaluation circuit 96 transmits its position data to a control device 102. The control device 102 is connected via an interface 104 to a reception and transmission device 106, which in turn is connected to the radio antenna 78. The reception and transmission device 106 receives and generates radio waves, which are picked up and radiated by the antenna 78. By the reception and transmission devices 92, 106 and the radio antennae 74, 78, it is possible to transmit data from the control device 88 to the control device 102 and vice-versa. The connection between the radio antennae 74, 78 can be direct, for example, in a permissible radio range, such as citizen's band radio, or something similar, or made available via one or more relay stations, for example, if the reception and transmission devices 92, 106 and the radio antennae 74, 78 work according to the GSM or the UMTS standard or another suitable standard for mobile telephones.

In some embodiments, the control device 102 is connected to a steering device 108, which controls the steering angle of the front, steerable wheels 64 of the transport vehicle 12. Furthermore, the control device 102 sends speed signals to a speed specification device 110, which, via a variation of the engine rpm of the transport vehicle 12 and/or the gear transmission, controls the speed of the transport vehicle 12. Moreover, the control device 102 is connected to a permanent storage unit 120.

On board the harvesting machine 10, the control device 88 is connected to the electronic control unit 112, which, together with the actuators 46, 48, 52 it controls and the sensors 128, 130, 132 connected to it, forms a control arrangement for the control of the transfer of the crops from the harvesting machine 10 to the container 18 of the transport vehicle 12. In some embodiments, the electronic control unit 112 can be connected to a steering device 114, which controls the steering angle of the rear, steerable wheels 24. Furthermore, the electronic control unit 112 sends speed signals to a speed specification device 116, which, via a variation of the gear transmission, controls the propelling speed of the harvesting machine 10. The electronic control unit 112 is also connected to a throughput sensor 118, which detects the distance between the pre-compression rollers in the entry channel 30, with a sensor for the detection of the position of sensing arms 62 placed on a divider tip of the harvesting attachment 28; a permanent storage unit 122, via valve devices (not shown) with the actuators 46, 48, and 52 and with sensors 128, 130, 132, which respectively detect the position of one of the actuators 46, 48, and 52, and with an optical image capture device 136, which is placed more or less in the middle of the adjustable transfer device 40 on its left or right or underside 40A (FIG. 1A), and during the harvesting operation, is aligned on the container 18 and is preferably implemented as a stereo-camera having two lenses 137 and two image sensors (not shown) arranged one above the other or side by side. The electronic control unit 112 receives the signals from the optical image capture device 136 via an image processing system 138 that processes the image signals from a signal output of the optical image capture device 136 in order to extract the position of features of the container 18 within the field of view 135 of the optical image capture device 136.

In some embodiments, the electronic control unit 112 can be connected to a user interface 140A mounted in the cabin 28. The user interface 140A comprises a display unit 142 and a user interface with keys 144, which could also be complemented or replaced by a touch-sensitive display unit 142A. Another user interface 140B with at least one key 148 is provided on a hydraulic handle 146 (not shown) that is pivotally mounted and coupled with a sensor 150 connected to the electronic control unit 112 in order to receive manual propelling speed commands by the operator in the cabin 28. Some of the above mentioned components are also illustrated in FIG. 1A.

Figure 4A:
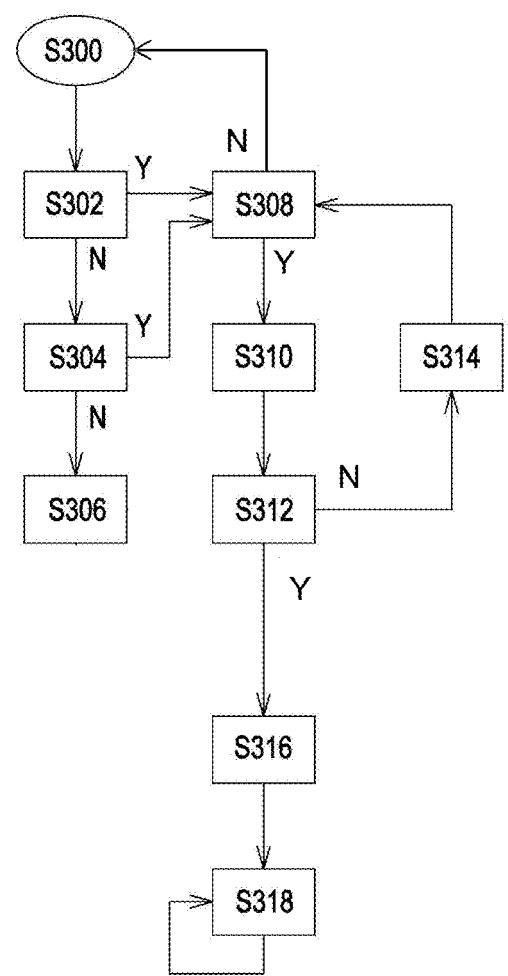
FIGS. 4A and 4B are flow diagrams showing operation of the control arrangement, according to one embodiment.
Figure 4B:
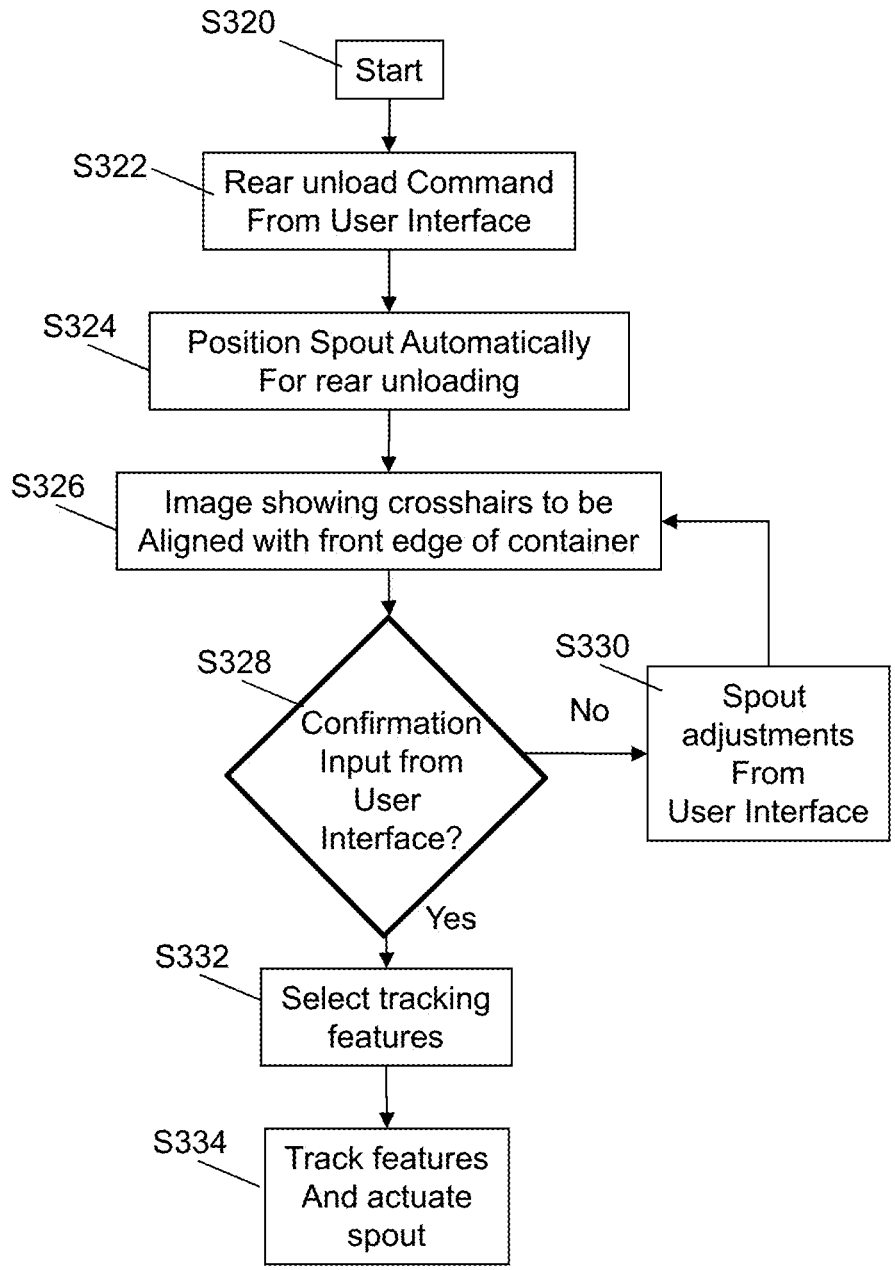

Operation of the electronic control unit 112 is schematically shown in FIGS. 4A and 4B, according to one embodiment. Now turning to FIG. 4A, after start in S300, i.e. after a harvest operation switch (which might be one of the keys 144 or another key, not shown, on a dashboard in the cabin 28) of the harvesting machine 10 is switched on, and the operation of the electronic control unit 112 is initialized, step 302 follows. In step 302, it is checked whether a container search command was received from the user interfaces 140A, 140B (FIG. 3A), thus from a key 144 or a key 148 assigned to input the desire of the operator to locate a container 18 at a position where it is difficult to locate by the optical image capture device 136. Such a position is, in particular, the position behind the harvesting machine 10 and the transport vehicle 12, as shown in FIGS. 1A and 1B, since the container 18 is relatively far away from the optical image capture device 136. Under certain circumstances, as bad visibility or a container 18 having a color similar to the color of the field 34, it can however also be useful and possible to input a container search command when the container 18 is alongside the harvesting machine 10.

If the result of step S302 is "no," step S304 follows. In step S304, it is checked whether the adjustable transfer device 40 is in a rear unloading position according to the signal of the sensor 128. If this is not the case, step S306 is executed, in which the electronic control unit 112 controls actuators 46, 48, 52 according to the signal from the optical image capture device 136, processed by image processing system 138. This means that in the image from the optical image capture device 136, features are identified, for example the upper edge 19 of the container 18 (FIG. 1B), and the actuators 46, 48, 52 are controlled such that the crop flow expelled by the adjustable transfer device 40, hits the interior of the container 18. A feedback for the impact point of the crop plants 58 on the container 18 can be derived from the image signal from the optical image capture device 136. Further, since the optical image capture device 136 is a stereo camera, its signals allow to estimate a distance between the harvesting machine 10 and the container 18 and the height of the upper edges 19 of the container 18 over ground, such that the actuators 46, 48 and 52 can be controlled according to a known kinematic model of the free crop flow downstream the adjustable transfer device 40.

On the other hand, if the result in step S302 or S304 is "yes," the electronic control unit 112 proceeds with step S308. This step and the following ones are used to find a container 18 in the image of the optical image capture device 136 in difficult cases, such as a rear unloading situation shown in FIGS. 1A and 1B, in which it is not easy for the electronic control unit 112 to identify the container 18 in the mentioned image.

In step 308, the electronic control unit 112 calculates a position of an expected point of incidence of the crop flow on the container 18, if it is within the field of view 135 of the optical image capture device 136 (FIG. 1A). The calculation first identifies the container 18 in the field of view 135 in an image captured by the optical image capture device 136. Next, expected points of incident within the container 18 are calculated based on the captured image. Thus, if no container 18 is in the field of view 135 of the optical image capture device 136, the process terminates here and goes back to step S300. If on the other hand a container 18 is in the field of view 135 of the optical image capture device 136, the position of an expected point of incidence of the crop flow on the identified container 18 is calculated, based upon the sensor signal in order to learn the direction of the crop flow after leaving the adjustable transfer device 40, and based on an output signal of the image processing system 138, since the electronic control unit 112 needs to know the distance between the harvesting machine 10 and the container 18 in order to derive the expected point of incidence. The distance between the discharge spout 45 of harvesting machine 10 (or the machine 10 itself, e.g. the rotation point of the discharge spout 45 around the vertical axis) and the front edge 19A of the container 18 can be derived from the signal of the image processing system 138 since the optical image capture device 136 is a stereo camera. If the optical image capturing device 136 were a monocular camera, the size (pixels) of the near edge of the container 18 in the image could be used as an estimate for the mentioned distance. Additionally or instead, the mentioned distance can be derived from position data of the harvesting machine 10 using the position-determining device 72 and a position of the transport vehicle 12 transmitted by the radio antennas 74, 78. The orientation of the spout 45 based on position of actuator 46, 48, or 52 is used to determine the path of crop flow. These alternative embodiments are discussed in further detail in later paragraphs of this disclosure.

In step S308, the known kinematic model of the free crop flow downstream of the adjustable transfer device 40 is applied, like in step S306, to calculate where the crop flow would theoretically intersect top plane of the container 18 opening. This position can be calculated in absolute coordinates, for example using the position data from the first position-determining device 72, or in relative coordinates with an origin for example at the rotation point of the adjustable transfer device 40 around the approximately vertical axis.

Step S308 is followed by step S310, in which an image of the container 18 is shown on the display unit 142 together with a symbol 800 (FIGS. 8A and 8B) representing alignment of spout 45 with front edge 19A of container 18 that coincides with the calculated expected point of incidence of the crop flow on the container discussed above. In other words, the crop flow will intersect the calculated expected point of incidence when symbol 800 is aligned with front edge 19A of container 18. The image can be non-processed, i.e. directly come from the optical image capture device 136, or be pre-processed by the image processing system 138 in order to remove unimportant details and to emphasize, for example by adding color or changing brightness, features identified in the image that might resemble the container 18.

Figure 8A:
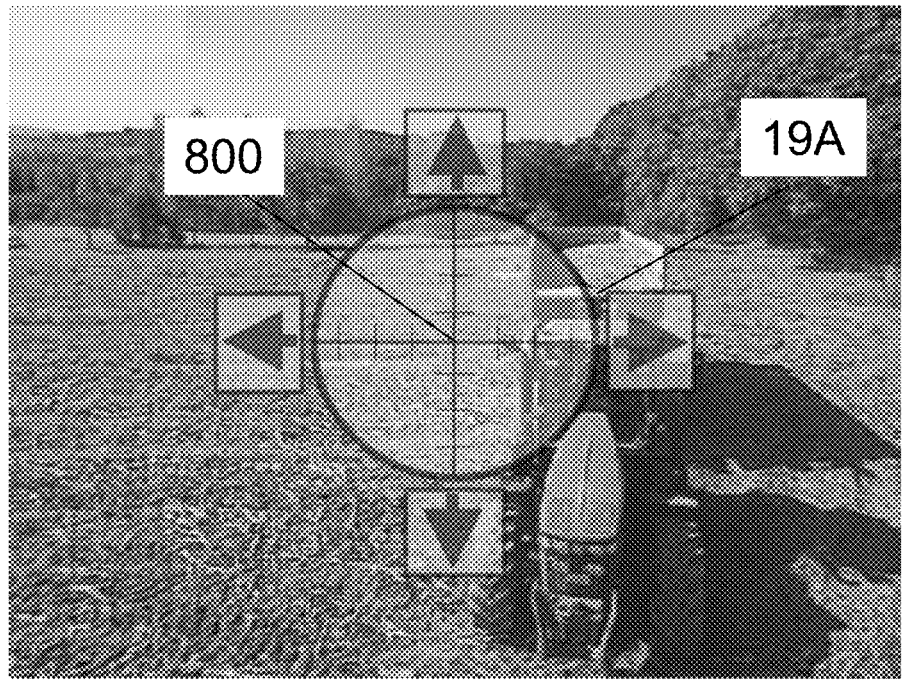
FIGS. 8A and 8B are photographs illustrating a transport vehicle pulling a container, where the edge of the container is used for alignment.
Figure 8B:
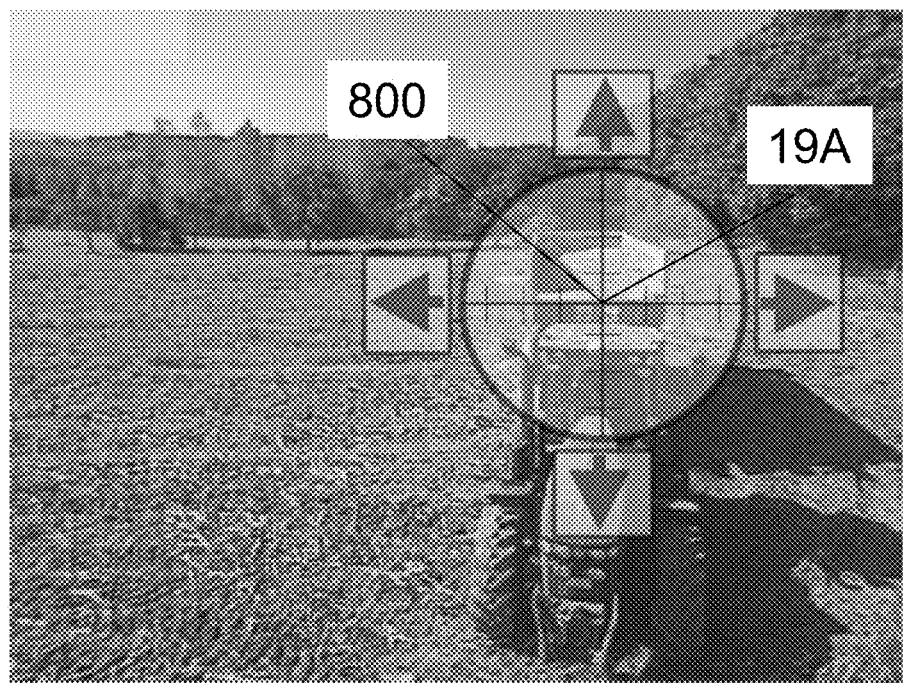

In step S312, the electronic control unit 112 checks whether a confirmation input was received via an assigned one of the keys 144 and/or 148 from the user interface 140A, 140B. By depressing the key, the operator in the cabin 28 can confirm that according to his or her opinion the symbol in the image on the display unit 142 is in an appropriate position with respect to the displayed image of the container 18 to fill the container 18 with crop (FIG. 8B). This confirmation input could also be input by means of a touch-sensitive display unit 142A or orally or by a suitable gesture detector. Thus, if the result of step S312 is "no," it can be assumed that the symbol 800 shown on the display unit 142 is outside the image of the container 18.

In this case, step S314 follows in which the electronic control unit 112 can receive adjustment inputs from the user interface (by means of keys 144 and/or 148) for adjusting the position of one or more of the actuators 46, 48, 52 and thus of the adjustable transfer device 40. The electronic control unit 112 thus controls the position of the actuators 46, 48 and/or 52. Step S314 is followed again by step S308, in which a new image is taken by the optical image capture device 136, and by step S310, in which the position of the symbol 800 in the image on the display unit 142 is updated according to the output of the sensors 128, 130, 132, which is now changed due to the movement of one or more of the actuators 46, 48, 52. In the situation where symbol 800 is not aligned with front edge 19A of container 18 (FIG. 8A.), the operator can move symbol 800 in alignment with front edge 19A of container 18 thereby actuating actuator 46 to rotate spout 45 into position aligned with container 18 for rear unloading in which the symbol 800 is located on the display unit 142 aligned with the image of front edge 19A of the container 18 (FIG. 8B). The adjustment of the symbol 800 to the front edge 19A of the container 18 can be performed, if necessary, in the horizontal direction and in the vertical direction, be it simultaneously or subsequently, dependent on the operator's choice or as provided by an automated system.

Another embodiment of the present invention considers the container 18 being pulled on a side of the harvesting machine 10 where the symbol 800 can be adjusted to align with the upper lateral edge of the container 18 or a side opening thereof. Other embodiments of the present invention can accommodate container orientations relative to the harvesting machine 10, whether the container is aft, forward, or along-side of the harvesting machine 10, and any feature of the container 18 within the field of view of the optical capture device 136.

On the other hand, if the operator has confirmed in step S312 that the symbol 800 in the image on the display unit 142 is in an appropriate position with respect to the displayed image of the container 18 (FIG. 8B.) to fill the container 18 with crop, step S316 is executed, in which the control unit 112 derives at least one feature in the image representing the container. This is relatively easy, since the container 18 can be assumed to be in close vicinity to symbol 800. The electronic control unit 112 thus uses in step S316 the known position of the symbol and suited features in the vicinity of the symbol 800 in the image. The electronic control unit 112 can identify the upper edges 19A of the container 18 in the image. The identified feature is preferably highlighted in the image on the display unit 142, for example by color or brightness. In embodiments where symbol 800 is not used, tracking can be accomplished by using the relative position of the container.

In the following step S318, the electronic control unit 112 tracks the container 18 within the output signal of the image processing system 138 based on the image feature retrieved in step S316 and controls the actuators 46, 48, 52 in a suitable manner, as described with respect to step S306, in order to fill the container 18 with the harvested crop without spilling significant amounts of crop onto the ground. In step S318, actual images can be shown on the display unit 142 (FIG. 8B), like in step S310, in order to inform the operator about the position of the container 18 as detected by the electronic control unit 112 (preferably highlighting the detected and tracked feature of the container 18) and the expected location of the crop impact point on the container 18 by means of the symbol 800.

The embodiment depicted in FIG. 4A can be summarized as follows:

S300: Start

S302: Container Search Command Received (key 148)

S304: Adjustable transfer device 40 in Rear Position (Sensor 128)

S306: Control Actuators 46, 48, 52 according to signal from image capture device (e.g., camera) 136.

S308: Calculate a position of the spout 45 (or transfer device) relative to a predetermined location of a container and an expected point of incidence of the crop flow on a container within the field of view of the optical image capture device based upon the sensor signal and on an output signal of the image processing system.

S310: Display an image of the container 18 together with a symbol 800 on the display unit representing the alignment of spout 45 with front edge 19A of container 18, which is coincident with the calculated expected point of incidence of the crop flow on the container. Though Step 310 is presented chronologically or sequentially following Step 308, one embodiment of the present invention (not illustrated) provides for Step 310 to precede Step 308.

S312: Confirmation input from the user interface received to confirm that the symbol in the image on the display is in an appropriate position with respect to the displayed image of the container to fill the container with crop?

S314: Receive adjustment inputs from the user interface for adjusting the position of the actuator(s) 46, 48, 52 and control the actuator(s) 46, 48, 52.

S316: Derive at least one feature in the image representing the container 18.

S318: Track the container 18 within the output signal of the image processing system based on the image feature retrieved in step S316 and control the actuator(s) accordingly to fill the container 18 with crop.

Now turning to FIG. 4B, the embodiment depicted in this figure can be summarized as follows:

S320: Start.

S322: Rear Unload Command from User Interface.

S324: Position spout automatically for rear unloading. Any commercially available software that performs the automated spout positioning function can be incorporated into the present invention. Electronic control unit 112 receives the rear unload command from the user interface 140A. The ECU 112 manipulates actuators 46, 48, 52 to position the spout 45 into a known orientation that is reasonable for rear unloading. Sensors 128, 130, 132 provide feedback to the ECU 112 to close the feedback loop on the orientation of the spout 45.

S326: Image showing a visual alignment indicator 800 (e.g., cross hairs, cross or target as shown in FIGS. 8A and 8B) to be aligned with front edge 19A of the container. The visual alignment indicator is created in the electronic control unit 112. The visual alignment indicator 800 is overlaid on top of the image from the camera 136 and streamed to the display unit 142 that the operator sees. Ideally, the operator would maneuver the spout 45 of the harvester 10 such that the visual alignment indicator 800 is pointed to the front edge 19A of the contain 18 and press a button to engage the system. The system would then identify the front edge 19A of the container 18 and track its position.

S328: Confirmation of input from operator (Yes or No).

S330: If S328 indicates no confirmation of input from operator, then spout adjustments are made and repeat S326.

S332: If S328 indicates confirmation of input from operator, then the tracking algorithm automatically chooses salient features to be used for tracking the front edge 19A of the container 18. The salient features are unique regions in the images that are on the front side of the container 18.

S334: Track features and actuate spout. Once the salient features on the front side of the container 18 are selected, the crosshairs 800 could either disappear from the overlay or the software could automatically adjust the crosshairs 800 to point at the center of the front edge 19A of the container 18.

It will become apparent that various modifications can be made without departing from the scope of the invention. For example, one or more functions of the electronic control unit 112 can be provided by separate electronic control units, not shown. In steps S306 and S318, control of the adjustable transfer device 40 can be augmented according to a relative position of the container 18 with respect to the harvesting machine 10 derived from position data of the harvesting machine 10 using the position-determining device 72 and a position of the transport vehicle 12 transmitted by the radio antennas 74, 94.

Figure 5:
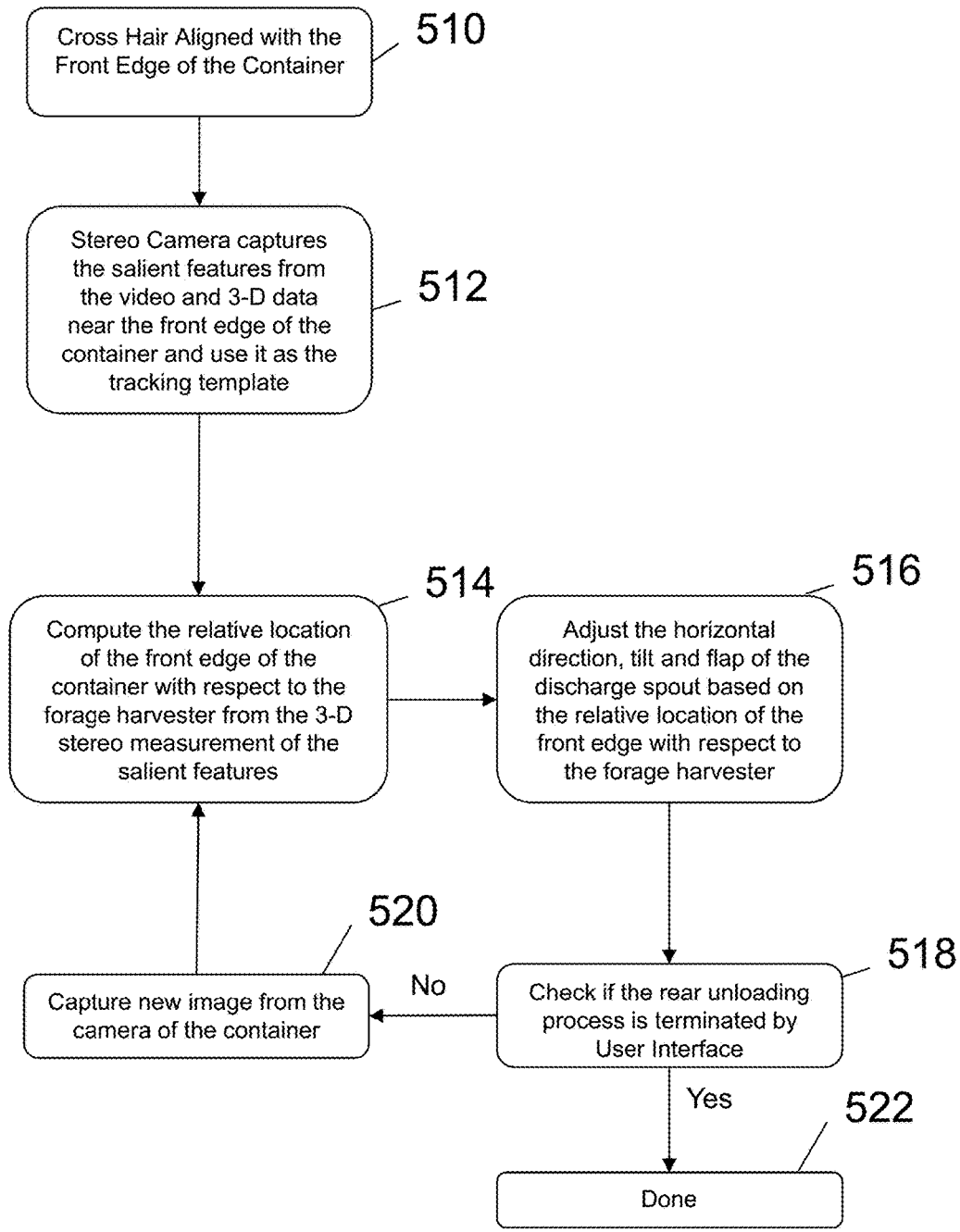
FIG. 5 is a flow chart of the tracking steps according to one embodiment.

Now turning to FIG. 5 to illustrate one embodiment of the tracking processes, when symbol 800 is used, of the present invention for rear unloading.

Block 510: Indicator 800, such as cross hairs (FIGS. 8A and 8B), are aligned with the front edge 19A of the container 18.

Block 512: Stereo Camera captures the salient features from the video (FIGS. 8A and 8B) and 3-D data near the front edge 19A of the container 18 and use it as the tracking template.

Block 514: The relative location of the front edge 19A of the container with respect to the forage harvester 10 is computed from the 3-D stereo measurement of the salient features. The salient features of the front edge 19A are identified automatically by the tracking algorithm based on unique appearance or shape.

Block 516: The horizontal direction, tilt and flap of the discharge spout is adjusted based on the relative location of the front edge 19A with respect to the forage harvester 10.

Block 518: A check is performed whether the rear unloading process is terminated by the operator. If the check is "Yes," then the process continues to Block 522 and the procedure to done. If the check is "No," then the process continues to Block 520 to capture a new image from the camera of the container and the process returns to Block 514 for continued processing.

In alternative embodiments, a target tracking module 402 tracks the container 18 without performing step 510. That is, tracking occurs without using the crosshair symbol 800 as a starting point for finding the container 18. In yet another alternative embodiment, the receiving vehicle 12 and not the container 18 is tracked.

Figure 6:
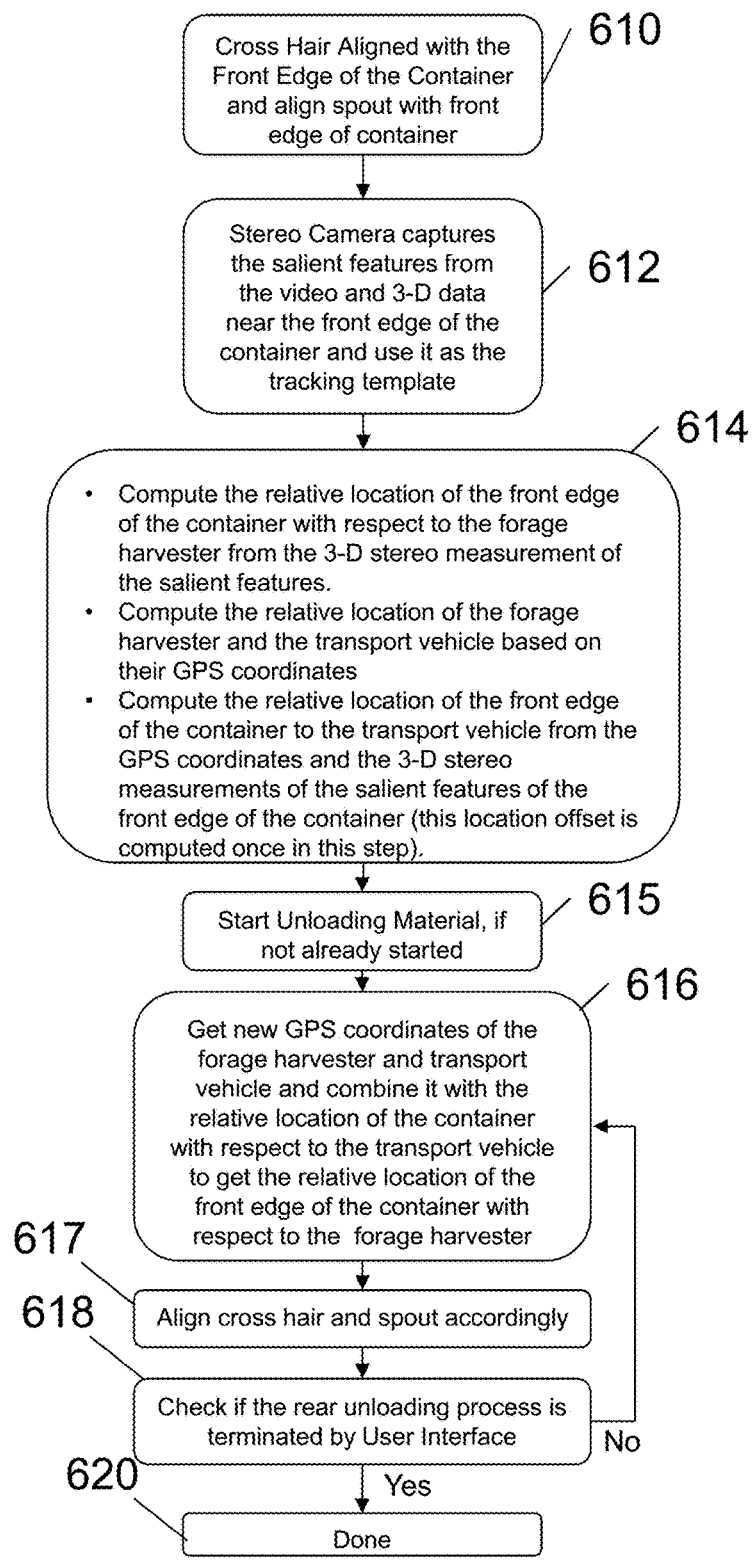
FIG. 6 is a flow chart of the tracking steps of another embodiment of the present invention utilizing GPS.
Figure 7:
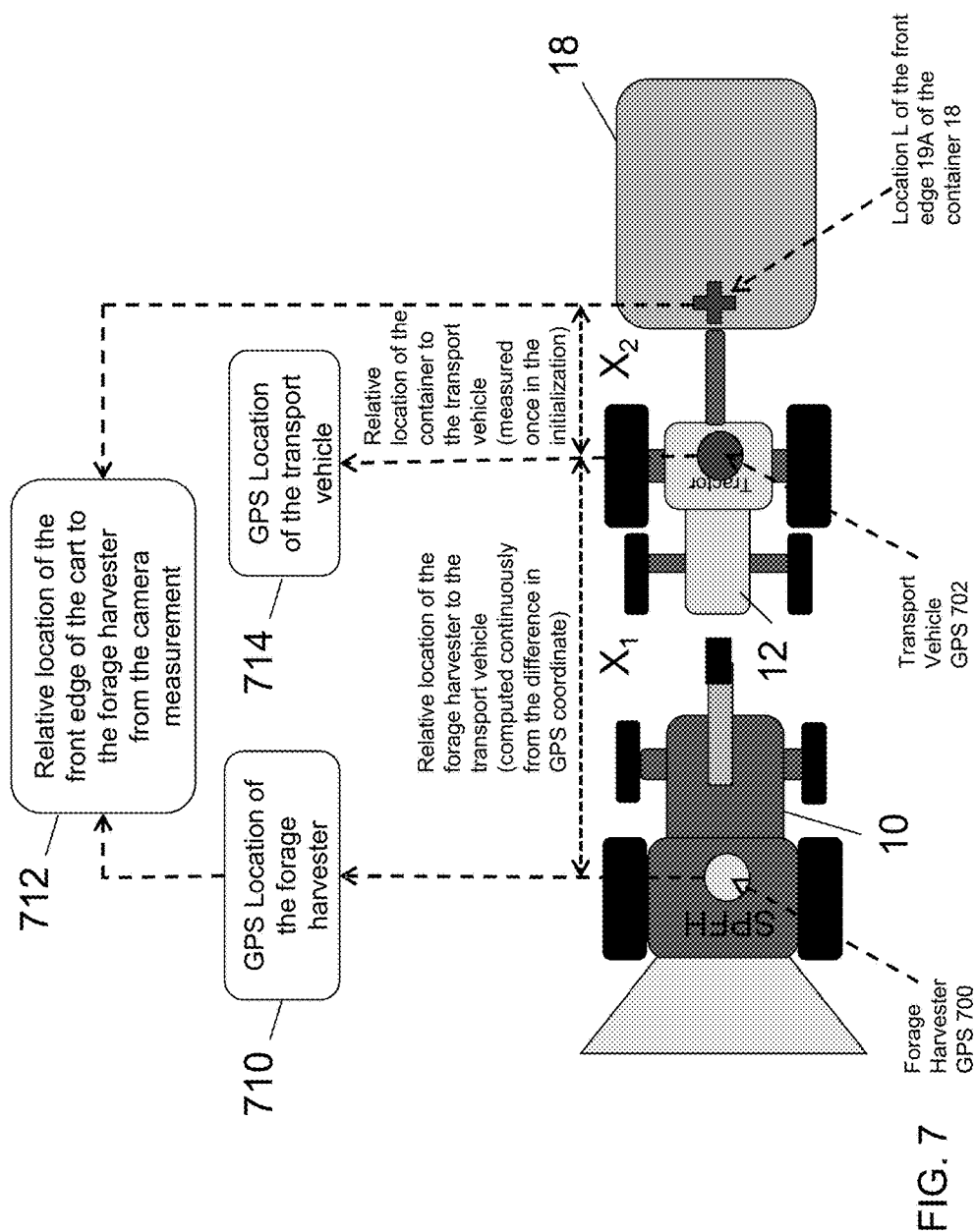
FIG. 7 is an illustration of one embodiment of the present invention utilizing GPS to track the transport vehicle relative to the harvesting vehicle.

FIG. 6 shows an alternative embodiment of the present invention that utilizes position measuring devices on both the harvesting machine 10 and transport vehicle 12 to assist the optical image capture device 136 in measuring the relative motion between the harvesting machine (i.e forage harvester) 10 and transport vehicle 12 of FIG. 7.

Block 610: An indicator 800, such as crosshairs, is aligned with the front edge 19A of the container (FIGS. 8A and 8B) and spout 45 is adjusted to align with the front edge 19A of the container 18 as discussed above.

Block 612: A stereo camera 136 (FIG. 1A) captures the salient features from the video and 3D data near the front edge 19A of the container 18 and uses it as the tracking template.

Block 614: A series of steps are performed:
Compute the relative location of the front edge 19A of the container with respect to the forage harvester 10 from the 3D stereo measurement of the salient features.
Compute the relative location $X_1$ of the forage harvester 10 and the transport vehicle 12 based on their GPS coordinates from their respective GPS units, or position-determining devices 72 and 76.
Compute the relative location $X_2$ of the first edge 19A of the container 16 to the transport vehicle 12 from the GPS coordinates and the 3D stereo measurements of the salient features of the front edge 19A of the container 18 (relative location $X_2$ is an offset computed once in this step).

Block 615: Start Unloading Material, if not already started;

Block 616: New GPS coordinates of the forage harvester 10 and transport vehicle 12 are received and combined with the relative location $X_2$ of the container 18 with respect to the transport vehicle 12 to get the relative location $(X_1+X_2)$ of the container 18 with respect to the forage harvester 10.

Block 617: Align cross hair of indicator 800 and spout 45 accordingly to maintain accurate discharge of the material into container 18.

Block 618: A check is performed to determine whether the rear unloading process is terminated by the operator. If check is "Yes," then the process continues to Block 620. If check is "No," then the process returns to Block 616 to continue the process.

In alternative embodiments, control of the adjustable transfer device 40 is accomplished without confirming the expected point of incidence of the crop within the container 18. In these alternative embodiments, the control arrangement localizes the receiving container 18 in the harvester surroundings. The identified pose of the container 18, whether determined directly or indirectly, is used to calculate the target location commanded to the harvester 10 in order to deposit the crop material into the container 18.

Two techniques can be used for estimating the receiving container 18 position—direct estimation and indirect estimation. In a first technique, the control arrangement directly tracks the position of the receiving container 18 by receiving data about the position and/or pose of the container 18. In one embodiment of the direct tracking technique, onboard sensors (such as an optical image capture device 136) on the harvester 10 provide data about the position of the receiving container 18 relative to the harvester 10. In this embodiment, the image capture device 136 requires visibility of the receiving container 18. Alternatively, the image capture device 136 provides data about the receiving vehicle 12, which is pulling the container 18.

In a second embodiment, the receiving container 18 reports its own position to the harvester 10. The relative position is then determined using the harvester's onboard GPS sensor (or first position-determining device 72) or its odometry based pose. The receiving container 18 can determine its position in multiple ways depending on the embodiment. For composed articulated receiving vehicles 12, the position of the container 18 can be derived from the pose of the pulling segment (for example, the tractor or truck cabin) and a sensor 420 on the receiving vehicle 12 or container 18 that calculates a relative offset between pulling vehicle 12 and container 18.

In a second technique for estimating the receiving container 18 position, the control arrangement indirectly tracks the container 18 by tracking the receiving vehicle 12 position and extrapolating the trajectory of the container 18 being pulled by the receiving vehicle 12. In alternative embodiments, a hybrid approach is used where the position of the container 18 is indirectly estimated and partial corrections are made to the indirect estimation based on direct observations when available.

Using the hybrid approach, an example embodiment of the control arrangement comprises a target detection module 401, a target tracking module 402, a kinematic module 403, and a position filter 414. Further, the hybrid approach utilizes a container heading estimator 412 and a receiving vehicle articulated modeling module 413. While these modules are described in terms of an embodiment using the hybrid approach of estimating the container 18 position, certain of the modules are used in the direct and indirect estimation technique as well. For example, an embodiment using the direct estimation technique with a sensor 420 utilizes the target detection module 401, the target tracking module 402, the kinematic module 403, and a position filter 414. A direct tracking embodiment using position-determining device 72 and/or 76 uses the kinematic model 403 and position filter 414, but not the detector module 401 and tracking module 402. For indirect tracking, one example embodiment uses the aforementioned modules in addition to processing data regarding the articulation of the container 18.

Figure 9:
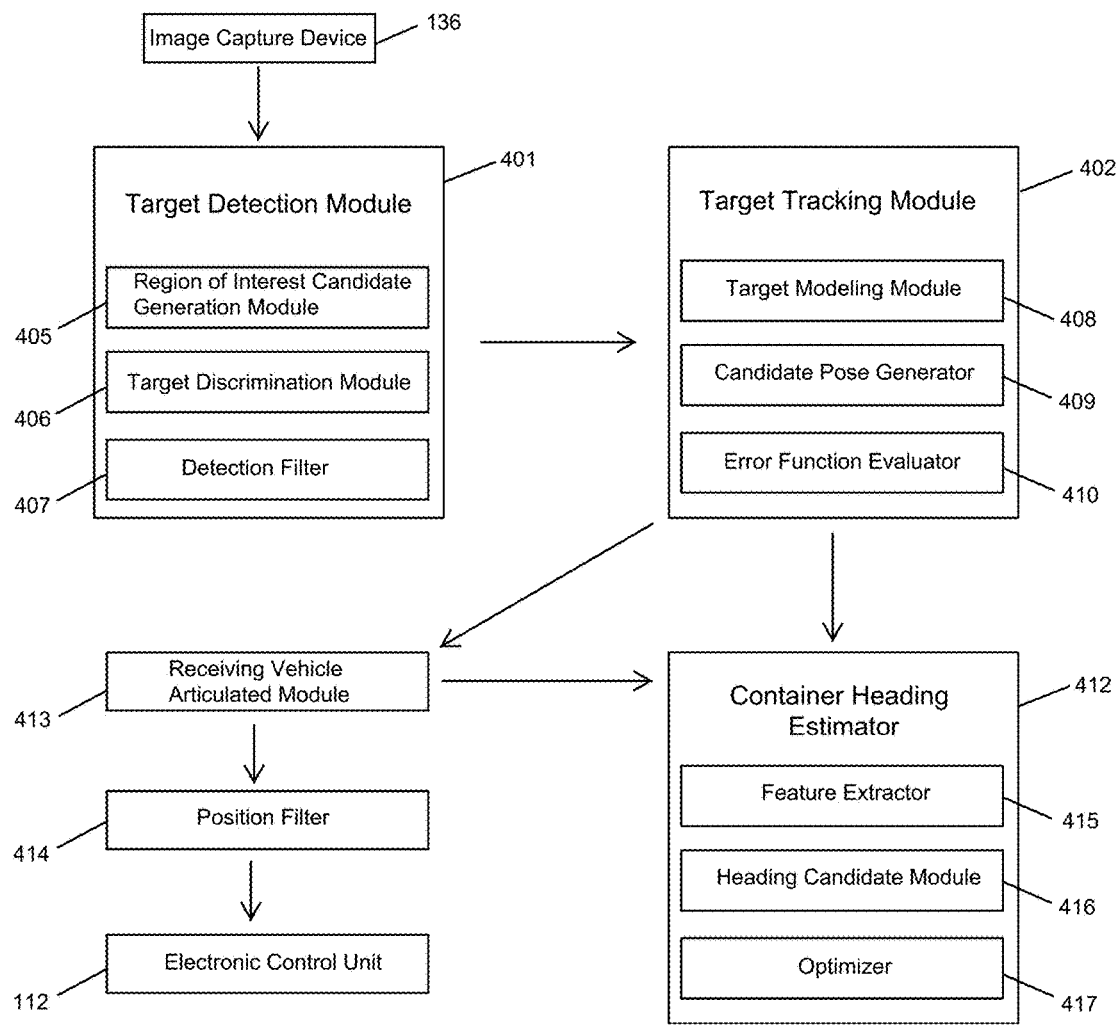
FIG. 9 is a schematic of a control arrangement according to one embodiment.

FIG. 9 is a simplified system diagram illustrating the hybrid approach. First, the target detection module 401 receives image data from the image capture device 136 or the image processing system 138. Optionally, the target detection module 401 receives data about the spout 45 position from the kinematic module 403. As will be discussed in more detail, the target detection module 401 identifies a region in the image data that likely corresponds to the target, which can be the receiving vehicle 12 or container 18. This information is sent to a target tracking module 402, which determines the pose trajectory of the target in the scene. The pose trajectory is sent to both the container heading estimator 412 and receiving vehicle articulated module 413, which help improve the accuracy of pose trajectory in certain situations. The current pose trajectory is then sent to a position filter 414. Finally, the trajectory is used by the electronic control unit 112 to control the position of the spout 45. The electronic control unit 112 uses the data, in addition to data provided by the kinematic module 403 and material projection module 411 to determine the expected crop incidence point.

In this disclosure, any module, estimator, filter, generator, evaluator, or optimizer may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. Further, the modules may be standalone unit or may be part of the electronic control unit 112.

Table 1, shown below, demonstrates different embodiments of direct, indirect, and hybrid tracking techniques and the modules used in each embodiment. The embodiments listed in Table 1 are examples and different combinations of modules can be used depending on the desired performance and other parameters.

TABLE 1

| Estimation Technique | | | |
| --- | --- | --- | --- |
| DIRECT ESTIMATION (sensor from harvester 10) | DIRECT ESTIMATION (receiving vehicle data) | INDIRECT ESTIMATION | HYBRID |
| Target detection module 401 | Differential positioning | Target detection module 401 | Target detection module 401 |
| Target tracking module 402 | Kinematic module 403 | Target tracking module 402 | Target tracking module 402 |
| Kinematic module 403 | Position filter 414 | Kinematic module 403 | Kinematic module 403 |
| Position filter 414 | | Receiving vehicle articulated module 413 | Receiving container heading estimator 412 |
| | | Position filter 414 | Receiving vehicle articulated module 413 |
| | | | Position filter 414 |

The target detection module 401 localizes an object of interest (such as a tractor or driver's cabin for indirect tracking or the container 18 for direct tracking) in image data provided by the image capture device 136 or image processing system 138. Stated differently, the target detection module 401 uses the image data of the harvester's surroundings as input and produces an estimate of the target object's position and extent as output.

To provide the target object's position, the target detection module 401 first generates a region of interest in the image data using a candidate generation module 405. The region of interest candidate generation module 405 selects regions of the image that could contain the target. In one embodiment, the module 405 uses the relative position of the image capture device 136 to the scene to model the prior knowledge of the most likely positions of the target based on the current mode of operation. That is, the candidate generation process is sensitive to the position of the image capture device 136 relative to the target. For example, in one embodiment, the image capture device 136 is mounted on the spout 45 and, thus, its position is reported by the kinematic model 403. In this example, the location of the horizon can be determined, which then can be used to constrain the search area. Similarly, a model of the harvester extent defines an exclusion zone where the target cannot be located.

In addition to geometric data about the scene, operation settings defined by the user (such as the type of the receiving vehicle configuration) will help estimate the base dimensions of the search area. In an alternative embodiment, the candidate generation module 405 includes a trainable component that adjusts the region of interest dimensions based on features extracted from the input sensor data, such as local height per region. By using geometric data and scene features, the computational costs are reduced.

Once a region of interest is generated, a target discrimination module 406 analyzes the region of interest provided by the region of interest candidate generation module 405 to classify areas in the region of interest as background areas or target areas (for example, areas where the container 18 is located).

In one embodiment, a simple window-scanning approach is used to analyze the image data. More specifically, engineered features extracted from predefined windows of the input are discriminated using a linear classifier. In order to accelerate the feature extraction process, integral channel descriptions are used when possible. When a stereo camera is used for the image capture device 136, range information can be used to incorporate geometry-based features to the set of descriptions, which increases the precision of the classifier with respect to methods only using appearance information.

The feature computation is organized in two possible sequential slots or channels. This scheme simplified sharing features in one of the channels with other stages (for example, region of interest generation), while optionally evaluating the other channel if required depending on the input sample, providing significant computational savings when providing real-time target detection.

Table 2 (shown below) presents different combinations of features that can be used for target discrimination. These features are complementary in term of discriminative power and robust to different degenerations in the input sensor data (e.g. dusty image conditions or errors in the image capture device position). In one embodiment, the feature set includes the Histogram of Oriented Gradients (HOG), a descriptor commonly applied in image, depth, and height space. The input features block-normalized for best classification behavior.

TABLE 2

| Channel 1 | Channel 2 |
| --- | --- |
| Appearance features, HOG, masked by depth | |
| Histogram of Oriented Displacments (HOD) | |
| Appearance features, HOG, masked by HOD | |
| Appearance features, HOG | HOGD Median-depth per-cell Binary mask of depths Combo-HOG |
| Appearance features, HOG, masked by height | |
| Appearance features, | HHOG-nonlinear |

TABLE 2-continued

| Channel 1 | Channel 2 |
| --- | --- |
| HOG | HHOG-linear |
|  | Median-height per-cell, nonlinear |
|  | Median-height per-cell, linear |
| Image features, HOG | Perspective-skewed fast-height |
|  | Gravity features |

In one embodiment, the target discrimination module 406 uses a simple linear Support Vector Machine (SVM) classifier. However, in alternative embodiments, more complex state-of-the-art models can be used, depending of the performance and computation requirements of the control arrangement. Since all of the inputs features are normalized, the linear scheme supports dynamic short-circuiting, allowing the model to only compute a portion of the detection score. This "lazy evaluation" technique is commonly used to optimize machine learning pipelines and avoids the computation of extra features when an input windows is clearly classified as part of the background after only evaluating the first feature channel.

In the example embodiment described above, a multi-staged system (candidate generation module 405 and target detection module 406) is used due to its simplicity and reduced computational resources. However, combined algorithms based on deep models can be used in alternative embodiments.

With a multi-stage system, the overall localization accuracy/detection rate can be optimized while reusing many of the intermediate results. For example, the geometrical features computed by the candidate generation module 405 are reused as part of one of the features channels. In this manner, the candidate generation module 405 focuses on localization and a low false negative rate, while the target detection module 406 focuses on a low false positive rate. To reduce false positives, a non-maxima suppression algorithm incorporates some prior information on the position of the container 18 to compensate biases in the detection process, such as conflicting and overlapping detections.

In the last stage of target detection, a detection filter 407 aims to provide consistency in the detections by rejection outliers. In many situations, providing consistency requires large datasets for comparison that cannot always be stored. To overcome this issue, in one embodiment, an out-of-core incremental and iterative stochastic gradient descent algorithm is used. In this embodiment, not all samples have to be concurrently loaded or even fit into memory, which allows training with far more data than some existing libraries might support. However, a person having skill in the art will appreciate that other filters can be used to reduce the rate of false-positives.

As described, the target detection module 401 is capable of detecting the receiving vehicle 12 or container 18, regardless of its physical configuration. Further, beacons or manual interaction is not required. The module 401 provides low false detection rates, using an active attention focus mechanism (candidate generation module 405) that uses information such as the current operation status or spout position, as a guide for the selection of the region of interests in the input sensor data most likely to contain the target. Additionally, the target detection module 401 provides high discriminative power in different scenarios, including poor texture conditions and cluttered environments, by using image and geometry features. Lastly, an iterative out-of-core training procedure provides improved false-positive rates by preventing overfitting compensation using implicit and hard negative mining tuning.

Once a target is detected, a target tracking module 402 determines the pose trajectory of the target, such as the receiving vehicle 12 or the container 18. In one embodiment, the tracking module computes trajectory with four degrees of freedom (3D position plus heading), together with the dimensions of the target (length, width and height), using the input data from the image capture device 136. In one embodiment, the tracking module 402 determines the optimal pose of the target by minimizing the differences between each input sensor data frame and a projected target pose. Differences are evaluated using a cost function defined by the photometric error (differences in pixel intensities) and, optionally, geometrical error (differences in pixel depth). In one embodiment, the cost function is minimized by taking an analytical derivative from the re-projected points, or, in an alternative embodiment, through a stochastic exploration of the solutions space where pose compositions are non-deterministically evaluated against the template.

The tracking module 402 comprises a target modeling module 408, a candidate pose generator 409, and an error function evaluator 410. The target modeling module 408 builds a model of the tracked vehicle (i.e. receiving vehicle 12 or container 18). The first iteration of the model is initialized to contain the point cloud enclosed by the target detection computed by the target detection module 401. The model is populated with all points within a certain depth and lateral distance of the initialization point, from the perspective of the target's frame. In one embodiment, the points in this region had been previously preprocessed using a median filter on the depth component to provide invariance to stereo noise. After populating, the model is then validated by assessing quality checks to confirm that a valid target has been detected and tracking is viable. For example, a valid target is detected if minimum point cloud dimensions are present and tracking is viable if the target is located within an acceptable distance range. However, other quality checks can be used.

After the first initialization, the target modeling module 408 incrementally refines the model in subsequent image frames to account for slow variations in the target template and to reflect the full extent of the tractor 12 as its segmentation is completed. For example, in subsequent frames, the model incorporates points from new view angles. In one embodiment, candidate points are incorporated into the model by applying a 3D flood-fill operation around the location of the target predicted by an estimation of the motion of the target. These candidates are then validated against the template point cloud. Points that align between the observed cloud and the prior model are used to update the model.

One challenge of the modelling process is accurately segmenting the tractor from other elements when the scene is cluttered (e.g. presence of high crop in the near proximity of the target). To assist this process, in one embodiment, weak symmetry and dimension constraints are used to restrict the incorporation of new points to the model. This prevents tracking from biasing towards the adjacent crop when the target model erroneously incorporates points outside the vehicle. In yet another embodiment, an elevation map and restrictions given by the size and orientation of a model bounding box are used to constrain segmentation. Low locations are likely to belong to the ground and can be potentially discarded. Higher locations have to be checked against the model bounding box to discard points belonging to the crop or the receiving container, if the receiving vehicle 12 is being tracked.

Once the target is modeled, the candidate pose generator 409 determines the absolute pose of the target. After the first initialization, the candidate pose generator 409 uses relative motion in the target to disambiguate its absolute pose. Although the XYZ position of the target can be directly inferred from the location of the initialization point, determining the heading requires estimating the direction of travel for the target. The heading is computed using an Extended Kalman Filter (EKF), including a simple vehicle motion model. Once target motion is detected and the direction of travel is estimated, the pose generator 409 aligns the dominant axis of the target template box and uses the resulting pose as reference for the next frame computation.

Upon receiving the next frame or set of data, the pose generator 409 composes incremental variations to the pose computed on the previous frame until it converges on the optimal value describing the current pose. As previously discussed, in one embodiment this process is performed analytically by following the direction of the cost function gradient. Alternatively, the process is performed by a stochastic process. The EKF provides a prediction of the location of the model in the current frame which can be used as a starting point of the optimization or help guiding the stochastic search. Once the pose is deemed sufficiently accurate, the pose generator 409 provides the results to the other modules or components in the control arrangement. In one embodiment, the results are passed to an error function evaluator 410, which analyzes the photometric error of the model projected into the current image frame. Alternatively, geometric error can also be used.

Figure 10:
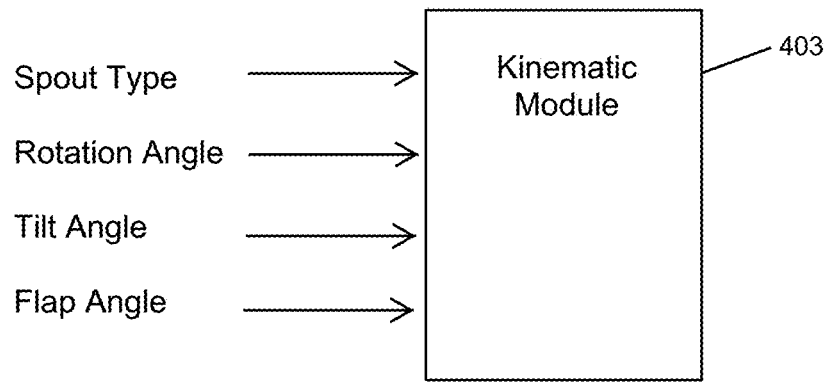
FIG. 10 shows the inputs to a kinematic module.

With the target detected and tracked, a kinematic module 403 is used to determine the current coordinates and orientation of the spout 45. The orientation of the spout 45 comprises rotation angle, tilt angle, and the angle of spout flap 50. As shown in FIG. 10, the spout 45 parameters are inputs to the kinematic module 403. In order to perform this computation, the kinematic module 403 stores parameters specific to different types of spouts 45 and or adjustable transfer devices 40. The parameters contain information about specific dimensions and structure of the spout 45 and or adjustable transfer device 40. In one example embodiment, the specific spout 45 type installed on a harvester 10 is sent to the kinematic module 403 via the CAN bus 86. Knowing the type of spout 45 installed, the kinematic module 403 determines which spout parameters are applicable. Also transmitted via the CAN bus 86 are the current spout 45 rotation angle, title angle, and flap 50 angle.

With this information, the kinematic module 403 can determine the location of the point where the crop material exits the spout 45. Further, the kinematic module 403 determines the exit angle of the crop material exiting the spout 45. With this information, the material landing point can be calculated using a material projection module 411. In one embodiment, the landing point is estimated using a parabolic trajectory.

Figure 11:
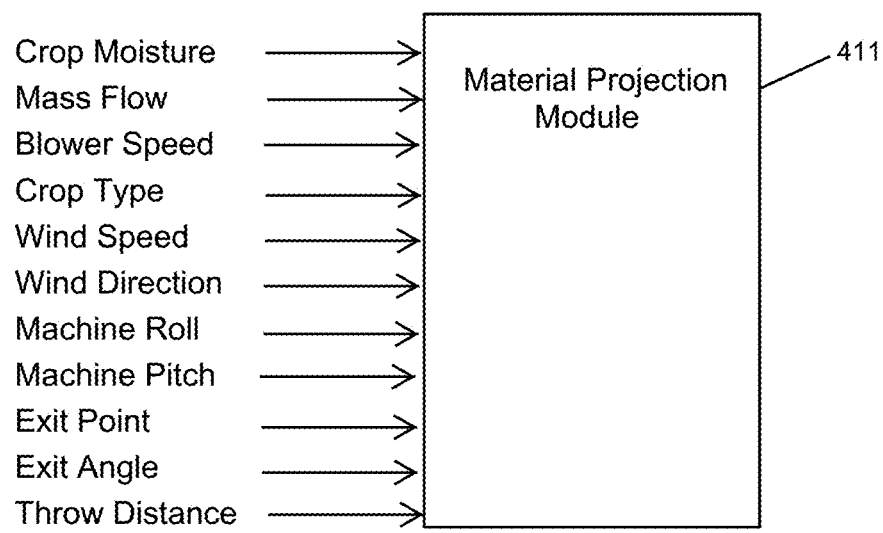
FIG. 11 shows the inputs to a material projection module.

The material projection module 411 calculates the landing point by using the crop material exit point and exit angle from the kinematic module 410 in addition to other parameters such as material initial velocity (preprogrammed or from a machine controller via CAN bus 86), crop type, crop moisture, mass flow, wind speed, wind direction, machine roll, and machine pitch. As shown in FIG. 11, these parameters are inputs to the material projection module 411. Depending on the extent to which these parameters affect the crop flight, the projection module 411 can make an assumption about the deceleration of the crop material from the exit point to the landing point. With the landing point of the crop determined and the location of the container 18 known, the control arrangement can cause changes in the adjustable transfer device 40 to accurately place the material in the desired location of the container 18. Further, an iterative process is used to compare the current material landing point to the desired landing point. Once the error between the actual and desired landing point is calculated, the spout 45 angles are adjusted until the difference between actual and desired material landing point is less than a given threshold.

In the hybrid estimation approach, the receiving container heading estimator 412 and receiving vehicle articulated module 413 are further used to supplement position estimation.

The receiving container heading estimator 412 computes the orientation (in the horizontal plane) of the receiving container 18 from the image data. The estimator 412 complements and corrects the receiving container pose indirectly estimated by the receiving vehicle articulated module 413.

Like the target tracking module 402, this module determines the pose of the target. However, there are differences between the two. In the estimator 412, heading estimation is limited to a single degree of freedom for the container 18 orientation (versus 4D pose) because this parameter is harder to predict using data from the receiving vehicle articulated module 413. The estimation is even more difficult when there is limited or erratic motion while starting the harvest operation.

In one embodiment, the receiving container heading estimator 412 comprises a feature extractor 415, a heading candidate module 416, and an optimizer 417. The feature extractor 415 identifies descriptors based on the appearance and geometrical information contained in the image data. The heading candidate module 416 explores the space of possible heading solutions, computing for each candidate angle a metric representing the probability of matching the expected value from the pre-computed image features of the target. The optimizer 417 determines the most likely heading maximizing the compatibility metric.

The feature extractor 415 assumes that the container 18 can be identified by two distinct features: strong edges or discontinuities in the pixel intensities representing the top opening of the container 18; and differentials in height with respect to adjacent elements, such as the crop. As such, the feature extractor 415 creates edge maps and density of height histograms from the image data. Prior information can be encoded in this feature extraction process to increase the robustness of the feature extractor 415. For example, the extractor 415 filters out edge features if they do not lie in a plausible range of heights, given prior information on specific container dimensions.

The heading candidate module 416 determines which receiving container orientation most closely aligns with the received image data. More specifically, the module 416 generates hypotheses of what the captured scene would look like if the container had orientation x, then identifies the value of x that most closely represents the captured scene based on a highest compatibility score to the features extracted from the actual input data.

Accordingly, the heading candidate module 416 first defines a set of candidate poses for the receiving container in the scene by invoking the articulated module 413 with a given range of heading values as input. The range of heading values is generated by composing incremental offsets to the last computed orientation in the previous frame. Next, the heading candidate module 416 computes the projections of the receiving container 18 in the input data frame for each of the candidate poses. Finally, the module 416 compares each candidate projection with the features computed in the actual input image data and generates a compatibility score for each of them.

In the case of the edges features, the module 416 synthesizes the line pattern that the top rectangular opening of the container 18 would generate for a given orientation. To assess the similarity of these edge patterns while being robust to background elements (e.g. shadows in adjacent crop), a compatibility score is defined such that it evaluates both spatial and orientation coherence. For example, in one embodiment, the perimeter of the container 18 opening is first expanded by a certain margin (to account for inaccuracies in the base position) and then projected into the input image. The projection is then divided into four quadrants and a compatibility metric is computed as the percentage of edge pixels with an orientation similar to the corresponding border of the receiving container 18, relative the total number of pixels. Testing only against a particular orientation and spatial location offers immunity to other background elements while avoiding complex edge computation processes to filter background or unconnected pixels. There is a certain tolerance in the edge orientation comparison allowed by operating in a binarized space, and ultimately this edge orientation computation can be reused with other stages of the system, such as HOG features.

For height features, the container 18 height range is inferred dynamically relative to the distribution observed on the input data. Certain distribution of heights are assumed to belong to various elements of the image (such as the ground, vehicles 10 and 12, and container 18). Consequently, the compatibility metric is defined as a function of the height distributions in each heading proposal. For noise invariance, the score uses a histogram of heights instead of the raw values. That is, the score is an engineered (nonlinear) combination of the counts within bins deemed on target, below-target, and above-target. The inferred range can be biased by scene elements that are at the same approximate height of the container 18. The situation can occur when the container 18 is adjacent to a tall crop segment. In one embodiment, calibration is done to account for tall crops or other similar height objects.

The optimizer 417 determines the optimal heading that lies at the maximum of the compatibility-metric curve. The optimizer 417 has to be robust to outliers and avoid producing solutions without enough evidential support (e.g., situations with bad visibility). In the case of edge features, for example, the optimizer 417 keeps track of the absolute number of edge pixels with the expected orientation for each candidate heading. When the number of such pixels supporting the best candidate orientation is below an absolute threshold (which can be empirically determined in testing sets), the optimizer 417 does not return a solution.

In one embodiment, for height features the optimizer 417 does not consider the height bins directly, but a Kernel-Density Estimator (KDE) produced from the samples drawn from the image. Critical points in the derivative of the KDE indicate whether the proposed solution is a spurious local maximum or represents a feasible heading. Thus, the container heading estimator 412 is able to determine the receiving vehicle heading from the image data.

The receiving vehicle articulated module 413 models the structure of the receiving vehicle 12. In general, the vehicle 12 is composed of two connected parts, the pulling element (tractor/truck cabin) and the container 18, which can comprise a cart, trailer, or truck bed. Using this module 413, the operator can query for the pose and dimensions of the receiving container 18 part using a set of adjustable parameters (such as the type of the receiving vehicle 12) and dynamic inputs (such as the position of the tractor/truck and heading offset to the receiving container 18).

The specific set of user-selectable parameters passed to the articulated module 413 is chosen as a trade-off between generality (being able to represent all possible receiving vehicles 12 found during operation) and simplicity (limiting the amount of time the operators require to configure the system before operation). In one embodiment, a uniform physical model for all possible receiving vehicles 12 is used. The uniform model has a library of default internal settings selectable by a single parameter observable by the operator, such as the type of receiving vehicle 12.

The receiving vehicle position filter 414 estimates the position and/or heading of the receiving container 18 over time. The filter 414 ensures a smooth trajectory and optionally provides pose predictions in the immediate future based on the vehicle kinematics. To accomplish this prediction, the filter 414 uses instantaneous pose information from the harvester 10 and the estimated relative position to the receiving vehicle 12 as and input, together with the configuration of the receiving vehicle 12 specified by the articulated module 413.

In one embodiment, the heading offset between receiving vehicle 12 and the container 18 is unknown and estimating the container 18 pose is more difficult than referring to the articulated module 413. In this situation, the filter 414 determines the container post, in part, by using the harvester 10 trajectory as a reference. The trajectory can be specified using the location device 702 or using onboard vehicle odometry. In one embodiment, the trajectory is determined from the linear and angular speeds provided by the location determining receiver 702. As described, the filter 414 indirectly infers the pose of the receiving container 18 and extrapolates predictions by combining the trajectory of the receiving vehicle 12 and the harvester 10.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method of controlling a spout arrangement on a transferring vehicle comprising:
   determining a position of a target relative to the transferring vehicle, wherein the target is located to a rear of the transferring vehicle;
   receiving information about the spout arrangement from a kinematic module;
   using a material projection module, calculating a trajectory of material exiting the spout arrangement to determine an expected material incidence point;
   using an electronic control unit, adjusting the spout arrangement to align the expected material incidence point with the target.

2. The method of claim 1, wherein the material trajectory is based on a parabolic trajectory.

3. The method of claim 1, wherein calculating the material trajectory further comprises receiving a velocity of the material exiting the spout arrangement.

4. The method of claim 1, further comprising:
calculating a rate of deceleration of the material through the trajectory.

5. The method of claim 1, wherein the trajectory is based on at least one of a moisture content of the material, a mass flow rate of the material exiting the spout arrangement, a wind speed, a wind direction, a roll angle of the transferring vehicle, a pitch angle of the transferring vehicle, a spout arrangement exit point, a spout arrangement exit angle, a flap angle, and a throw distance.

6. The method of claim 3, wherein the velocity is a predefined parameter.

7. The method of claim 3, wherein the velocity is transmitted by a controller on the transferring vehicle.

8. The method of claim 1, further comprising:
identifying an actual material incidence point.

9. The method of claim 8, further comprising:
comparing the expected material incidence point to the actual material incidence point; and
adjusting the spout arrangement until an error between the actual material incidence point and the expected material incidence point is below a threshold.

* * * * *